US010045350B2

(12) United States Patent
Wang et al.

(10) Patent No.: US 10,045,350 B2
(45) Date of Patent: Aug. 7, 2018

(54) METHOD OF JOINT CLUSTERING AND PRECODING AND BASE STATION USING THE SAME

(71) Applicant: National Tsing Hua University, Hsinchu (TW)

(72) Inventors: Chin-Liang Wang, Hsinchu (TW); Jyun-Yu Chen, New Taipei (TW); Siu-Hang Lam, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 126 days.

(21) Appl. No.: 15/215,400

(22) Filed: Jul. 20, 2016

(65) Prior Publication Data

US 2017/0257868 A1 Sep. 7, 2017

(30) Foreign Application Priority Data

Mar. 4, 2016 (TW) .............................. 105106627 A

(51) Int. Cl.
*H04B 7/216* (2006.01)
*H04W 72/04* (2009.01)
(Continued)

(52) U.S. Cl.
CPC ...... *H04W 72/0466* (2013.01); *H04B 7/0452* (2013.01); *H04B 7/0465* (2013.01); *H04B 7/2628* (2013.01); *H04W 72/048* (2013.01)

(58) Field of Classification Search
None
See application file for complete search history.

(56) References Cited

U.S. PATENT DOCUMENTS

2014/0314006 A1* 10/2014 Suh ...................... H04B 7/0452
370/329
2015/0156786 A1* 6/2015 Kim .................... H04B 7/0452
370/329

(Continued)

FOREIGN PATENT DOCUMENTS

| CN | 104640220 | 5/2015 |
| TW | 201134122 | 10/2011 |
| TW | 201531046 | 8/2015 |

OTHER PUBLICATIONS

Wang et al., "Relay Precoder Designs for Two-Way Amplify-and-Forward MIMO Relay Systems: An Eigenmode-Selection Approach," IEEE Transactions on Wireless Communications, Apr. 2016, pp. 5127-5137.

(Continued)

*Primary Examiner* — Fahmida Chowdhury
(74) *Attorney, Agent, or Firm* — J.C. Patents

(57) ABSTRACT

A method of joint clustering and precoding and a base station using the same are provided and applicable to a non-orthogonal multiple access (NOMA) system. The method includes: dividing four user equipments into a first cluster and a second cluster each consisting of two user equipments; forming a first cluster signal and a second cluster signal for simultaneous transmission at the base station; establishing a first precoding set and a second precoding set for the first cluster and the second cluster, respectively, by using channel state information between the base station and all the user equipments; selecting a first precoder from the first precoding set and a second precoder from the second precoding set; superposing the first cluster signal multiplied by the first precoder and the second cluster signal multiplied by the second precoder and broadcasting a resulting signal to the user equipments in the first and second cluster.

20 Claims, 6 Drawing Sheets

(51) Int. Cl.
*H04B 7/0456* (2017.01)
*H04B 7/0452* (2017.01)
*H04B 7/26* (2006.01)

(56) References Cited

U.S. PATENT DOCUMENTS

2015/0171947 A1* 6/2015 Sun .................. H04W 4/08
370/329
2015/0282185 A1 10/2015 Nikopour et al.

OTHER PUBLICATIONS

Siu-Hang Lam, "Joint Clustering and Precoding for a Downlink Non-Orthogonal Multiple Access System with Multiple Antennas," Master thesis, National Tsing Hua University, Jul. 2015, pp. 1-45.
Li et al., "5G Network Capacity Key Elements and Technologies," IEEE vehicular technology magazine, Jan. 2014, pp. 71-78.
Benjebbour et al., "Concept and Practical Considerations of Non-orthogonal Multiple Access (NOMA) for Future Radio Access," 2013 International Symposium on Intelligent Signal Processing and Communications Systems (ISPACS), Nov. 2013, pp. 770-774.
Saito et al., "System-Level Performance Evaluation of Downlink Non-orthogonal Multiple Access (NOMA)," 2013 IEEE 24th International Symposium on Personal, Indoor and Mobile Radio Communications, Sep. 2013, pp. 511-615.
Wang et al., "Comparison of Orthogonal and Non-Orthogonal Approaches to Future Wireless Cellular Systems," IEEE Vehicular Technology Magazine, Sep. 2006, pp. 4-11.
Ding et al., "On the Performance of Non-Orthogonal Multiple Access in 5G Systems with Randomly Deployed Users," IEEE Signal Processing Letters, Dec. 2014, pp. 1501-1505.
Kim et al., "Non-orthogonal Multiple Access in a Downlink Multiuser Beamforming System," 2013 IEEE Military Communications Conference, Nov. 2013, pp. 1278-1283.
Palomar et al., "Joint Tx-Rx Beamforming Design for Multicarrier MIMO Channels: A Unified Framework for convex Optimization," IEEE Transactions on Signal Processing, Sep. 2003, pp. 2381-2401.
Lan et al., "Considerations on Downlink Non-Orthogonal Multiple Access (NOMA) Combined with Closedloop SU-MIMO," 2014 8th International Conference on Signal Processing and Communication Systems (ICSPCS), Dec. 2014, pp. 1-5.
Sun et al., "On the Ergodic Capacity of MIMO NOMA Systems," IEEE Wireless Communication Letters, Apr. 2015, pp. 405-408.
"Office Action of Taiwan Counterpart Application", dated Apr. 12, 2018, p. 1-p. 8.

* cited by examiner

METHOD OF JOINT CLUSTERING AND PRECODING AND BASE STATION USING THE SAME

CROSS-REFERENCE TO RELATED APPLICATION

This application claims the priority benefit of Taiwan application serial no. 105106627, filed on Mar. 4, 2016. The entirety of the above-mentioned patent application is hereby incorporated by reference herein and made a part of this specification.

BACKGROUND OF THE INVENTION

1. Field of the Invention

The invention relates to a method of precoding, and more particularly, to a method of joint clustering and precoding and a base station using the same.

2. Description of Related Art

In the fourth generation mobile communication system, the orthogonal multiple access (OMA) system is widely used for accomplishing favorable system capacity. Yet, with advancements in technologies, the demand for system capacity will be increasingly higher for the future wireless communication. Therefore, the non-orthogonal multiple access (NOMA) system gradually becomes more important each day for the next (e.g., fifth) generation mobile communication system.

The NOMA system is capable of superposing the messages to multiple users with the appropriate power allocation between the users for allowing the users to access the same channel resources (e.g., the same time and frequency) and simultaneously transmitting the messages; and separates the superposed message for the users at the receiver by using the successive interference cancellation (SIC) technology. In general, the NOMA technology is capable of improving a use efficiency of the system resources to achieve a system capacity higher than that of the OMA technology.

Nonetheless, improvements are still to be constantly made to the design for the NOMA system. For example, it is a very important issue that must be addressed as how to deal with the interference between multiple users in order to accomplish the goal for maximizing the system capacity. In other words, the optimization of the overall transmission performance for the NOMA system is one of the subject matters concerned by person skilled in the art.

SUMMARY OF THE INVENTION

The invention provides a method of joint clustering and precoding and a base station using the same. The base station of the invention first appropriately divides the messages to be transmitted to the multiple user equipments into cluster signals, and then designs an appropriate precoder for each cluster signal according to channel state information between the base station and each of the user equipments. Each of the user equipments may use a zero forcing (ZF) matrix to cancel an inter-cluster interference and use a SIC technology to cancel an intra-cluster interference at the receiver. In addition, the invention further provides a method capable of canceling the interferences between the users while reducing the system complexity based on maximizing the system capacity.

An embodiment of the invention provides a method of joint clustering and precoding, which is adapted to a base station for transmitting the messages to at least four user equipments in a NOMA system. Said method includes steps of: dividing the at least four user equipments into a first cluster and a second cluster each consisting of two user equipments; forming a first cluster signal to be transmitted to the first cluster and a second cluster signal to be transmitted to the second cluster; establishing a first precoding set and a second precoding set for the first cluster and the second cluster, respectively, by using channel state information between the base station and the at least four user equipments; selecting a first precoder from the first precoding set and selecting a second precoder from the second precoding set, wherein the second precoder aligns a first channel and a second channel between the base station and the user equipments in the first cluster to a first space, and the first precoder aligns a third channel and a fourth channel between the base station and the user equipments in the second cluster to a second space; multiplying the first cluster signal by the first precoder to generate a first transmission signal and multiplying the second cluster signal by the second precoder to generate a second transmission signal; and superposing the first transmission signal and the second transmission signal and broadcasting a resulting signal to the first cluster and the second cluster.

In an embodiment of the invention, the first cluster signal includes a first signal and a second signal to be transmitted to a first user equipment and a second user equipment in the first cluster, respectively, and the step of forming the first cluster signal to be transmitted includes: comparing a first channel gain of the first user equipment and a second channel gain of the second user equipment; allocating a first power factor for the first signal and allocating a second power factor for the second signal, wherein the allocated first power factor is less than the second power factor if the first channel gain is greater than the second channel gain; multiplying the first signal by the first power factor to generate a first user signal and multiplying the second signal by the second power factor to generate a second user signal; and superposing the first user signal and the second user signal for forming the first cluster signal.

In an embodiment of the invention, the second cluster signal includes a third signal and a fourth signal to be transmitted to a third user equipment and a fourth user equipment in the second cluster, respectively, and the step of forming the second cluster signal to be transmitted includes: comparing a third channel gain of the third user equipment and a fourth channel gain of the fourth user equipment; allocating a third power factor for the third signal and allocating a fourth power factor for the fourth signal, wherein the allocated third power factor is less than the fourth power factor if the third channel gain is greater than the fourth channel gain; multiplying the third signal by the third power factor to generate a third user signal and multiplying the fourth signal by the fourth power factor to generate a fourth user signal; and superposing the third user signal and the fourth user signal for forming the second cluster signal.

In an embodiment of the invention, the step of selecting the first precoder from the first precoding set and selecting the second precoder from the second precoding set includes: performing an eigen-decomposition for a first channel matrix composed of the third channel and the fourth channel to generate a plurality of first eigenvectors of the first precoding set; performing the eigen-decomposition for a second channel matrix composed of the first channel and the second channel to generate a plurality of second eigenvectors of the second precoding set; and selecting a first part from the first eigenvectors to serve as the first precoder and selecting a second part from the second eigenvectors to serve as the second precoder.

In an embodiment of the invention, an amount of the first part is one half of the first eigenvectors, and an amount of the second part is one half of the second eigenvectors.

In an embodiment of the invention, the first channel, the second channel, the third channel, and the fourth channel are corresponding to the first user equipment, the second user equipment, the third user equipment, and the fourth user equipment, respectively. After the step of selecting the first precoder from the first precoding set and selecting the second precoder from the second precoding set, the method further includes: performing a matrix decomposition for the first precoder multiplied by the third or the fourth channels to obtain a first ZF matrix; performing the matrix decomposition for the second precoder multiplied by the first or the second channels to obtain a second ZF matrix; and informing the first cluster and the second cluster of the first ZF matrix and the second ZF matrix, respectively.

In an embodiment of the invention, the at least four user equipments include a first user equipment, a second user equipment, a third user equipment, and a fourth user equipment, and the step of dividing the at least four user equipments into the first cluster and the second cluster each consisting of two user equipments includes three combinations. A first combination includes assigning the first user equipment and the second user equipment to the first cluster and assigning the third user equipment and the fourth user equipment to the second cluster. A second combination includes assigning the first user equipment and the third user equipment to the first cluster and assigning the second user equipment and the fourth user equipment to the second cluster. A third combination includes assigning the first user equipment and the fourth user equipment to the first cluster and assigning the second user equipment and the third user equipment to the second cluster.

In an embodiment of the invention, the step of establishing the first precoding set and the second precoding set for the first cluster and the second cluster, respectively, by using the channel state information between the base station and the at least four user equipments includes: establishing the first precoding set and the second precoding set corresponding to the first combination; establishing the first precoding set and the second precoding set corresponding to the second combination; and establishing the first precoding set and the second precoding set corresponding to the third combination.

In an embodiment of the invention, the step of selecting the first precoder from the first precoding set and selecting the second precoder from the second precoding set includes: determining the first precoder and the second precoder for maximizing a system capacity from the first precoding set and the second precoding set individually corresponding to the three combinations, wherein the system capacity is a sum of a first capacity of the first cluster and a second capacity of the second cluster.

In an embodiment of the invention, the step of multiplying the first cluster signal by the first precoder to generate the first transmission signal and multiplying the second cluster signal by the second precoder to generate the second transmission signal includes: determining a specific combination for maximizing the system capacity from the three combinations; determining the first cluster signal and the second cluster signal corresponding to the specific combination; and multiplying the first cluster signal corresponding to the specific combination by the first precoder for maximizing the system capacity to generate the first transmission signal and multiplying the second cluster signal corresponding to the specific combination by the second precoder for maximizing the system capacity to generate the second transmission signal.

In an embodiment of the invention, the step of dividing the at least four user equipments into the first cluster and the second cluster each consisting of two user equipments includes: calculating a channel gain of each of the at least four user equipments; sorting the at least four user equipments in descending order according to the channel gain of each of the at least four user equipments; and assigning two user equipments sorted at first and third places as the first cluster and assigning two user equipments sorted at second and fourth places as the second cluster.

An embodiment of the invention provides a base station, which is adapted to a non-orthogonal multiple access (NOMA) system. The base station includes a transceiver circuit, a storage circuit and a processing circuit. The transceiver circuit is configured to transmit messages to at least four user equipments. The storage unit stores a plurality of modules. The processing circuit is coupled to the storage circuit and the transceiver circuit and configured to access and execute the modules stored in the storage circuit. The modules include a user configuration module, a signal generation module, a precoder construction module, a precoder selection module, a signal computation module, and a signal superposition module. The user configuration module divides the at least four user equipments into a first cluster and a second cluster each consisting of two user equipments. The signal generation module generates a first cluster signal to be transmitted to the first cluster and generates a second cluster signal to be transmitted to the second cluster. The precoder construction module establishes a first precoding set and a second precoding set for the first cluster and the second cluster, respectively, by using channel state information between the base station and the at least four user equipments, wherein the second precoder aligns a first channel and a second channel between the base station and the user equipments in the first cluster to a first space, and the first precoder aligns a third channel and a fourth channel between the base station and the user equipments in the second cluster to a second space. The precoder selection module selects a first precoder from the first precoding set and selects a second precoder from the second precoding set. The signal computation module multiplies the first cluster signal by the first precoder to generate a first transmission signal and multiplies the second cluster signal by the second precoder to generate a second transmission signal. The signal superposition module superposes the first transmission signal and the second transmission signal and broadcasts a resulting signal via the transceiver circuit to the user equipments in the first cluster and the user equipments in the second cluster.

In an embodiment of the invention, the first cluster signal includes a first signal and a second signal to be transmitted to a first user equipment and a second user equipment in the first cluster, respectively. The signal generation module is configured to execute steps of: comparing a first channel gain of the first user equipment and a second channel gain of the second user equipment; allocating a first power factor for the first signal and allocating a second power factor for the second signal, wherein the allocated first power factor is less than the second power factor if the first channel gain is greater than the second channel gain; multiplying the first signal by the first power factor to generate a first user signal and multiplying the second signal by the second power factor to generate a second user signal; and superposing the first user signal and the second user signal for forming the first cluster signal.

In an embodiment of the invention, the second cluster signal includes a third signal and a fourth signal to be transmitted to a third user equipment and a fourth user equipment in the second cluster, respectively, and the signal generation module is further configured to execute steps of: comparing a third channel gain of the third user equipment and a fourth channel gain of the fourth user equipment; allocating a third power factor for the third signal and allocating a fourth power factor for the fourth signal, wherein the allocated third power factor is less than the fourth power factor if the third channel gain is greater than the fourth channel gain; multiplying the third signal by the third power factor to generate a third user signal and multiplying the fourth signal by the fourth power factor to generate a fourth user signal; and superposing the third user signal and the fourth user signal into the second cluster signal.

In an embodiment of the invention, the precoder selection module is further configured to execute steps of: performing an eigen-decomposition for a first channel matrix composed of the third channel and the fourth channel to generate a plurality of first eigenvectors of the first precoding set; performing the eigen-decomposition for a second channel matrix composed of the first channel and the second channel to generate a plurality of second eigenvectors of the second precoding set; and selecting a first part from the first eigenvectors to serve as the first precoder and selecting a second part from the second eigenvectors to serve as the second precoder.

In an embodiment of the invention, an amount of the first part is one half of the first eigenvectors, and an amount of the second part is one half of the second eigenvectors.

In an embodiment of the invention, the first channel, the second channel, the third channel, and the fourth channel are corresponding to the first user equipment, the second user equipment, the third user equipment, and the fourth user equipment, respectively, and the base station further includes an interference cancellation matrix generation module. The interference cancellation matrix generation module is configured to execute steps of: performing a matrix decomposition for the first precoder multiplied by the third or the fourth channels to obtain a first ZF matrix; performing the matrix decomposition for the second precoder multiplied by the first or the second channels to obtain a second ZF matrix; and informing the first cluster and the second cluster of the first ZF matrix and the second ZF matrix, respectively.

In an embodiment of the invention, the at least four user equipments include a first user equipment, a second user equipment, a third user equipment, and a fourth user equipment. The user configuration module is configured to divide the at least four user equipments into a first cluster and a second cluster each consisting of two user equipments based on three combinations. A first combination includes assigning the first user equipment and the second user equipment to the first cluster and assigning the third user equipment and the fourth user equipment to the second cluster. A second combination includes assigning the first user equipment and the third user equipment to the first cluster and assigning the second user equipment and the fourth user equipment to the second cluster. A third combination includes assigning the first user equipment and the fourth user equipment to the first cluster and assigning the second user equipment and the third user equipment to the second cluster.

In an embodiment of the invention, the precoder construction module is configured to execute steps of: establishing the first precoding set and the second precoding set corresponding to the first combination; establishing the first precoding set and the second precoding set corresponding to the second combination; and establishing the first precoding set and the second precoding set corresponding to the third combination.

In an embodiment of the invention, the precoder selection module is configured to determine the first precoder and the second precoder for maximizing a system capacity from the first precoding set and the second precoding set individually corresponding to the three combinations, wherein the system capacity is a sum of a first capacity of the first cluster and a second capacity of the second cluster.

In an embodiment of the invention, the signal computation module is configured to execute steps of: determining a specific combination for maximizing the system capacity from the three combinations; determining the first cluster signal and the second cluster signal corresponding to the specific combination; and multiplying the first cluster signal corresponding to the specific combination by the first precoder for maximizing the system capacity to generate the first transmission signal and multiplying the second cluster signal corresponding to the specific combination by the second precoder for maximizing the system capacity to generate the second transmission signal.

In an embodiment of the invention, the user configuration module is configured to execute steps of: calculating a channel gain of each of the at least four user equipments; sorting the at least four user equipments in descending order according to the channel gain of each of the at least four user equipments; and assigning two user equipments sorted at first and third places as the first cluster and assigning two user equipments sorted at second and fourth places as the second cluster.

Based on the above, the method of joint clustering and precoding and the base station using the same are provided by the embodiments of the invention. The base station using the method first divides the at least four user equipments into two clusters, so that the base station may then provide the appropriate precoders for the signals to be transmitted to each cluster according to the channel state information between the user equipments and the base station. As such, the user equipments may use the ZF matrix to cancel the inter-cluster interference and use the SIC technology to cancel the intra-cluster interference at the receiver. To sum up, the technique provided by the invention is capable of effectively reducing the interferences between users in the downlink NOMA system, so as to improve the transmission performance and increase the system capacity.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
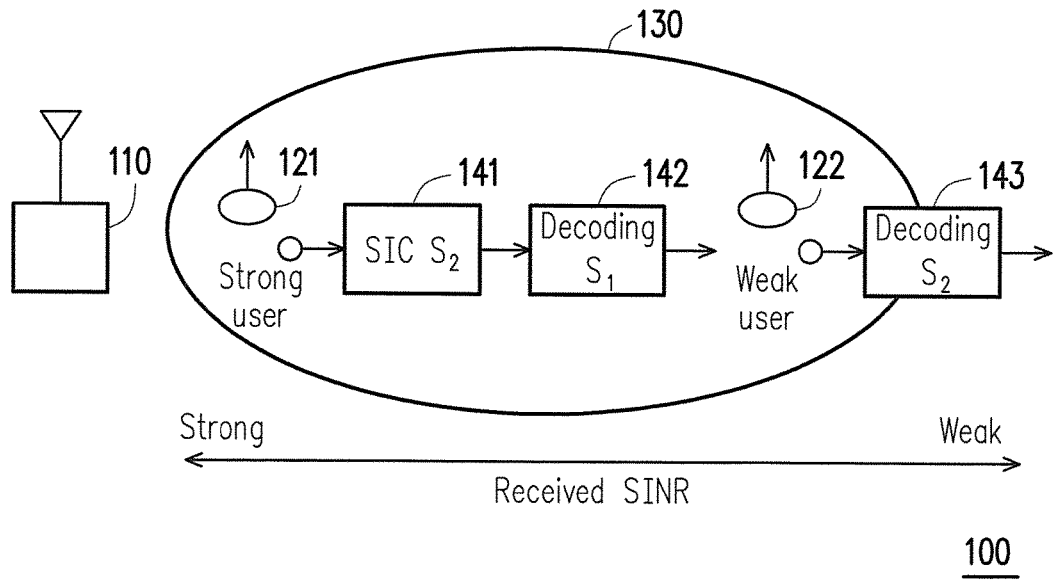
FIG. 1 is a schematic diagram of the SIC technology used at the receivers of the users.

Reference will now be made in detail to the present preferred embodiments of the invention, examples of which are illustrated in the accompanying drawings. Wherever possible, the same reference numbers are used in the drawings and the description to refer to the same or like parts.

In the NOMA system, a base station shares the same communication resource (e.g., time-domain or frequency-domain) for common use by multiple users in power-domain, so as to effectively improve spectrum efficiency. The base station superposes signals to be transmitted to multiple users by using the superposition coding and transmits a resulting signal. The signal separation may be conducted at the receivers of the users by using the SIC technology. Description regarding the SIC technology used in the NOMA system is provided below with reference to FIG. 1.

FIG. 1 illustrates a schematic diagram of the SIC technology used at the receivers of the users. Referring to FIG. 1, it is assumed that a downlink system 100 has a base station 110 and two user equipments 121 and 122, and the user equipments 121 and 122 are located within a coverage 130 of the base station 110, wherein the user equipment 121 has a greater channel gain and the user equipment 122 has a smaller channel gain. In the SIC technology, in order to correctly demodulate a signal transmitted by the base station 110 at the receiver (i.e., the user equipments 121 and 122), the base station 110 may perform a power allocation for signals to be transmitted to the user equipments 121 and 122. In the present embodiment, the user equipment 121 having the greater channel gain is defined as a strong user and the user equipment 122 having the smaller channel gain is defined as a weak user. The base station 110 allocates more transmission power for the signal of the weak user and allocates less transmission power for the signal of the strong user.

Specifically, the signal transmitted by the base station 110 to the user equipments 121 and 122 may be expressed as, for example, Equation (1) below $$\hat{x} = \sqrt{P_1}s_1 + \sqrt{P_2}s_2 \qquad \text{Equation (1)}$$

wherein $s_1$ denotes the signal to be transmitted to the user equipment 121 by the base station 110, $s_2$ denotes the signal to be transmitted to the user equipment 122 by the base station 110, and $\sqrt{P_1}$ and $\sqrt{P_2}$ denote allocated powers for the signals $s_1$ and $s_2$ respectively by the base station 110. It should be noted that, the allocated power $\sqrt{P_1}$ is less than $\sqrt{P_2}$ since the user equipment 121 has the greater channel gain as compared to the user equipment 122, but the invention is not limited thereto.

The signals $y_1$ and $y_2$ received by the user equipments 121 and 122 may be expressed as Equations (2.1) and (2.2) below $$y_1 = h_1\hat{x} + n_1 = \sqrt{P_1}h_1s_1 + \sqrt{P_2}h_1s_2 + n_1 \qquad \text{Equations (2.1)}$$

$$y_2 = h_2\hat{x} + n_2 = \sqrt{P_1}h_2s_1 + \sqrt{P_2}h_2s_2 + n_2 \qquad \text{Equations (2.2)}$$

wherein $h_1$ denotes a channel state information between the base station 110 and the user equipment 121, $h_2$ denotes a channel state information between the base station 110 and the user equipment 122, and $n_1$ and $n_2$ denote noises received by the user equipments 121 and 122, respectively, wherein $n_1$ and $n_2$ are, for example, the additive white Gaussian noise (AWGN), but the invention is not limited thereto.

In the SIC technology, because the base station 110 allocates more power $\sqrt{P_2}$ for the signal $s_2$, the signal $s_2$ may be detected and removed in advance at the user equipment 121 (e.g., a block 141 of FIG. 1) so the user equipment 121 may demodulate the signal $s_1$ (e.g., a block 142 of FIG. 1) without interference signals from other users. On the other hand, because the base station 110 allocates less power $\sqrt{P_1}$ for the signal $s_1$, the user equipment 122 may directly demodulate the signal $s_2$ (e.g., a block 143 of FIG. 1) by treating the signal $s_1$ as the noise. Accordingly, the spectrum efficiency and the overall system capacity may be effectively improved.

Figure 2:
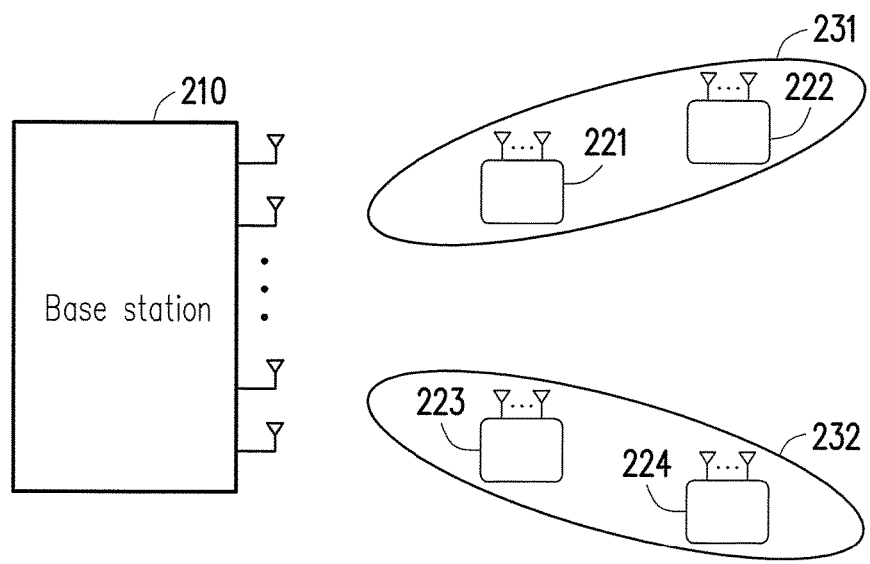
FIG. 2 is a schematic diagram illustrating a wireless communication system according to an embodiment of the invention.

FIG. 2 is a schematic diagram illustrating a wireless communication system according to an embodiment of the invention. In the present embodiment of the invention, a wireless communication system 200 is a NOMA system which includes a base station 210 and at least four user equipments (e.g., user equipments 221, 222, 223, and 224). It should be noted that, although FIG. 2 merely illustrates the four user equipments 221, 222, 223, and 224 for example, the invention may be expanded to more user equipments. In addition, each of the base station 210 and the user equipments 221, 222, 223, and 224 may be configured with M antennas so that the wireless communication system 200 of multiple-input multiple-output non-orthogonal multiple access (MIMO-NOMA) may be formed, wherein M may be a positive integer greater than 1, but the invention is not limited thereto.

In the present embodiment, to further improve a system capacity of the NOMA system, in addition to application of the SIC technology in the MIMO-NOMA system, the present embodiment further integrates with design of precoders for canceling interference between users and maximizing the system capacity, so as to realize the method of joint clustering and precoding proposed by the invention.

In the present embodiment, the user equipments 221, 222, 223, and 224 may be implemented by (but not limited to), for example, a mobile station, an advanced mobile station (AMS), a server, a user terminal, a desktop computer, a laptop computer, a network computer, a workstation, a personal digital assistant (PDA), a tablet personal computer (tablet PC), a scanner, a phone device, a pager, a camera, a television, a handheld video game device, a music device, a wireless sensor or the like, which are not particularly limited by the invention.

The base station 210 may include (but not limited to), for example, an eNB, a home eNB, an advanced base station (ABS), a base transceiver system (BTS), an access point, a home BS, a relay, an intermediate node, an intermediate equipment and/or a satellite-based communication base station, but the embodiment of the invention is not limited to the above.

Figure 3:
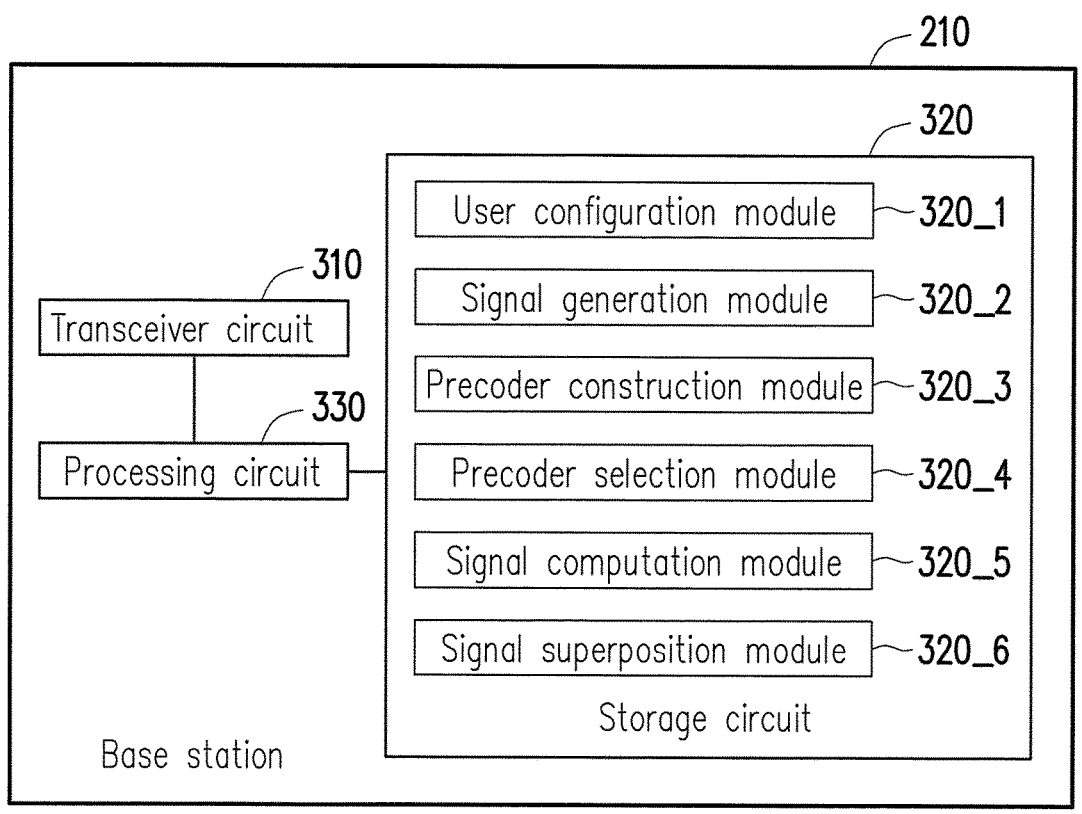
FIG. 3 is a block diagram illustrating a base station according to an embodiment of the invention.

In the present embodiment of the invention, the base station 210 may at least be represented by function elements depicted in FIG. 3. FIG. 3 is a block diagram illustrating a base station according to an embodiment of the invention. The base station 210 may at least include (but not limited to) a transceiver circuit 310, a storage circuit 320 and a processing circuit 330. The transceiver circuit 310 may include a transmitter circuit, an A/D (analog-to-digital) converter, a D/A converter, a low noise amplifier, a mixer, a filter, an impedance matcher, a transmission line, a power amplifier, one or more antenna circuits and a local storage medium element (but the invention is not limited thereto), such that the base station 210 may provide wireless transmitting/receiving functions to the at least four user equipments (i.e., the user equipments 221, 222, 223, and 224). The storage circuit 320 is, for example, a memory, a hard disk or other elements capable of storing data, and may be configured to record a plurality of program codes or modules.

The processing circuit 330 is coupled to the transceiver circuit 310 and the storage circuit 320, and may be a processor for general purposes, a processor for special purposes, a conventional processor, a digital signal processor, a plurality of microprocessors, one or more microprocessors, controllers and microcontrollers which are combined with a core of the digital signal processor, an application specific integrated circuit (ASIC), a field programmable gate array (FPGA), any other integrated circuits, a state machine, a processor based on advanced RISC machine (ARM) and the like.

Figure 4:
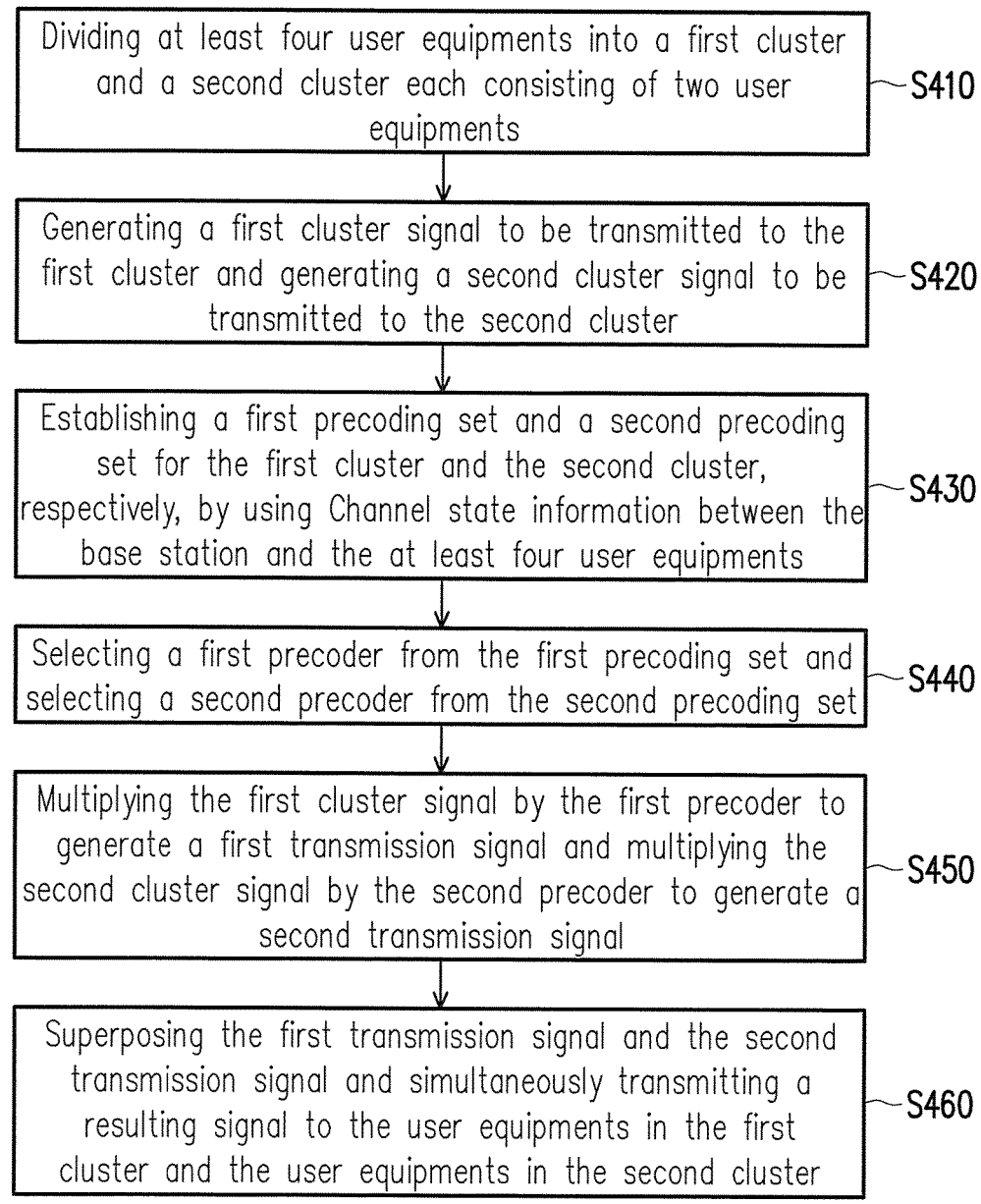
FIG. 4 is a flowchart illustrating the method of joint clustering and precoding according to an embodiment of the invention.

In the present embodiment, the processing circuit 330 may access and execute a user configuration module 320_1, a signal generation module 320_2, a precoder construction module 320_3, a precoder selection module 320_4, a signal computation module 320_5, and a signal superposition module 320_6 stored in the storage circuit 320, so as to execute each step of the method of joint clustering and precoding as proposed by the invention. FIG. 4 is a flowchart illustrating the method of joint clustering and precoding according to an embodiment of the invention. Referring to FIG. 2, FIG. 3, and FIG. 4, the method of FIG. 4 may be executed by the base station 210 of FIG. 3, and adapted to the wireless communication system 200 depicted in FIG. 2. Each step in the method of joint clustering and precoding of FIG. 4 is described below with reference to each element of the base station 210 of FIG. 3.

First of all, in step S410, the user configuration module 320_1 divides the user equipments 221, 222, 223, and 224 into a first cluster 231 and a second cluster 232 each consisting of two user equipments.

In the present embodiment, for enabling the user equipments 221, 222, 223, and 224 to adopt the aforementioned SIC technology for separating a plurality of superposed user signals transmitted by the base station 210, the user configuration module 320_1 divides the user equipments 221, 222, 223, and 224 into the first cluster 231 and the second cluster 232 each consisting of two user equipments so the user equipments 221, 222, 223, and 224 may execute the SIC between two users in the corresponding cluster. It should be noted that, as along as each of the first cluster 231 and the second cluster 232 includes any two different user equipments, the present embodiment is not intended to limit the method of dividing the user equipments 221, 222, 223, and 224. For clarity of the description, it is assumed that the first cluster 231 includes the user equipments 221 and 222 and the second cluster 232 includes the user equipments 223 and 224 in the present embodiment.

In step S420, the signal generation module 320_2 generates a first cluster signal to be transmitted to the first cluster 231 and generates a second cluster signal to be transmitted to the second cluster 232.

In the present embodiment, after the user equipments 221, 222, 223, and 224 are divided into the first cluster 231 and the second cluster 232 each consisting of two user equipments by the base station 210, the signal generation module 320_2 performs an appropriate power allocation for each of the user equipments 221, 222, 223, and 224 in the first cluster 231 and the second cluster 232 according to the user equipments and the channel gains thereof as included by each of the first cluster 231 and the second cluster 232. Then, the signal generation module 320_2 generates the first cluster signal and the second cluster signal for the first cluster 231 and the second cluster 232, respectively.

Specifically, the first cluster 231 includes the user equipments 221 and 222, and thus the first cluster signal includes a first signal and a second signal to be transmitted to the user equipments 221 and 222, respectively. The signal generation module 320_2 may compare a first channel gain of a first user equipment and a second channel gain of a second user equipment, so as to allocate a first power factor for the first signal and allocate a second power factor for the second signal according to a comparison result of said channel gains. It should be noted that, if the first channel gain is greater than the second channel gain, the allocated first power is less than the second power factor so as to allocate more power for the user equipment 222 having the smaller channel gain, and vice versa. In the present embodiment, it is assumed that the first channel gain is greater than the second channel gain. Accordingly, the user equipment 221 having the greater channel gain is defined as the strong user in the first cluster 231 and the user equipment 222 having the smaller channel gain is defined as the weak user in the first cluster 231. Then, the signal generation module 320_2 multiplies the first signal by the first power factor to generate a first user signal and multiplies the second signal by the second power factor to generate a second user signal. The signal generation module 320_2 superposes the first user signal and the second user signal to form the first cluster signal corresponding to the first cluster 231.

Similarly, the second cluster 232 includes the user equipments 223 and 224, and thus the second cluster signal includes a third signal and a fourth signal to be transmitted to the user equipments 223 and 224, respectively. The signal generation module 320_2 may compare a third channel gain of a third user equipment and a fourth channel gain of a fourth user equipment, so as to allocate a third power factor for the third signal and allocate a fourth power factor for the fourth signal according to a comparison result of said channel gains. It should be noted that, if the third channel gain is greater than the fourth channel gain, the allocated third power is less than the fourth power factor so as to allocate more power for the user equipment 224 having the smaller channel gain, and vice versa. In the present embodiment, it is assumed that the third channel gain is greater than the fourth channel gain. Accordingly, the user equipment 223 having the greater channel gain is defined as the strong user in the second cluster 232 and the user equipment 224 having the smaller channel gain is defined as the weak user in the second cluster 232. Then, the signal generation module 320_2 multiplies the third signal by the third power factor to generate a third user signal and multiplies the fourth signal by the fourth power factor to generate a fourth user signal. The signal generation module 320_2 superposes the third user signal and the fourth user signal to generate the second cluster signal corresponding to the second cluster 232.

In an embodiment, the first cluster signal and the second cluster signal transmitted to the user equipments 221, 222, 223, and 224 by the base station 210 may be expressed as a vector matrix $x_n$, as shown by Equation (3) below:

$$x_n = \sqrt{\rho_{n,1}} s_{n,1} \sqrt{\rho_{n,2}} s_{n,2}, n \in \{1,2\} \quad \text{Equation (3)}$$

wherein $s_{n,1} \in C^{N \times 1}$ denotes a signal to be transmitted to the strong user in an n-th cluster by the base station 210 (i.e., if n=1, the signal $s_{n,1}$ is corresponding to the first signal transmitted to the user equipment 221 in the first cluster 231, and if n=2, the signal $s_{n,1}$ is corresponding to the third signal transmitted to the user equipment 223 in the second cluster 232), $s_{n,2} \in C^{N \times 1}$ denotes a signal to be transmitted to the weak user in the n-th cluster by the base station 210 (i.e., if n=1, the signal $s_{n,2}$ is corresponding to the second signal transmitted to the user equipment 222 in the first cluster 231, and if n=2, the signal $s_{n,2}$ is corresponding to the fourth signal transmitted to the user equipment 224 in the second cluster 232), N is a number of transmit symbols, $\sqrt{\rho_{n,1}}$ denotes the power factor corresponding to the signal $s_{n,1}$, and $\sqrt{\rho_{n,2}}$ denotes the power factor corresponding to the signal $s_{n,2}$, wherein $\sqrt{\rho_{n,1}} < \sqrt{\rho_{n,2}}$. In addition, although the number of transmit symbols N is configured to be one half of the number of antennas M (i.e., N=M/2) equipped in the base station 210 or the user equipments 221, 222, 223, and 224 in the present embodiment of the invention, the invention is not limited thereto.

In step S430, the precoder construction module 320_3 establishes a first precoding set and a second precoding set for the first cluster and the second cluster, respectively, by using channel state information between the base station 210 and the user equipments 221, 222, 223, and 224.

In the present embodiment, if each of the first cluster signal and the second signal is multiplied by precoders $F_n \in C^{M \times N}$, $n \in \{1, 2\}$, a signal $\hat{x}$ transmitted by the base station 210 may be expressed as Equation (4) below:

$$\hat{x} = \sum_{n=1}^{2} F_n x_n. \quad \text{Equation (4)}$$

A signal $y_{n,i}$ received at the receiver (i.e., the user equipments 221, 222, 223, and 224) may be expressed as Equation (5) below:

$$y_{n,i} = H_{n,i} \hat{x} + v_{n,i}, n \in \{1,2\}, i \in \{1,2\} \quad \text{Equation (5)}$$

wherein i=1 denotes the signal received by the strong user in the n-th cluster, i=2 denotes the signal received by the weak user in the n-th cluster, $y_{n,i}$ denotes the signal received by an i-th user equipment in the n-th cluster, $H_{n,i} \in C^{M \times N}$ denotes a full-rank channel matrix between the i-th user equipment of the n-th cluster and the base station 210, and $v_{n,i}$ denotes a noise received by the i-th user equipment in the n-th cluster, wherein is, for example, the AWGN vector, but the invention is not limited thereto. In addition, after substituting Equations (3) and (4) into Equation (5), the signal $y_{n,i}$ received at the receiver (i.e., the user equipments 221, 222, 223, and 224) may be expanded into Equation (6) below:

$$y_{n,i} = H_{n,i} F_n \sqrt{\rho_{n,1}} s_{n,1} + H_{n,i} F_n \sqrt{\rho_{n,2}} s_{n,2} + H_{n,i} F_{\bar{n}} x_{\bar{n}} + v_{n,i},$$
$$\bar{n} \in \{1,2\}, \bar{n} \neq n, \text{ and } i \in \{1,2\}. \quad \text{Equation (6)}$$

It should be noted that, in Equation (6), for the strong user (i.e., the user equipments 221 or 223) in the n-th cluster, a second term in Equation (6) is the signal $s_{n,2}$ to be transmitted to the weak user (i.e., the user equipments 222 or 224) in the same cluster, and a signal $H_{n,i} F_n \sqrt{\rho_{n,2}} s_{n,2}$ forms an intra-cluster interference to the strong user; and vice versa. Further, a third term in Equation (6) is a signal $x_{\bar{n}}$ from the other cluster, and a signal $H_{n,i} F_{\bar{n}} x_{\bar{n}}$ is an inter-cluster interference.

In the present embodiment, to effectively cancel the inter-cluster interference signal $H_{n,i} F_{\bar{n}} x_{\bar{n}}$ at the receiver, the base station 210 designs the appropriate precoders $F_n \in C^{M \times N}$, $n \in \{1,2\}$ according to the user equipments 221 and 222 in the first cluster 231 and the user equipments 223 and 224 in the second cluster 232.

The precoder construction module 320_3 establishes the first precoding set and the second precoding set for the first cluster 231 and the second cluster 232, respectively, by using channels $H_{n,i}$ between the base station 210 and the user equipments 221, 222, 223, and 224. Specifically, the precoder construction module 320_3 establishes the precoding sets corresponding to the first cluster 231 and the second cluster 232 based on the eigenspaces of all the channels between the user equipments in each cluster and the base station 210. In the present embodiment, for the inter-cluster interference signal $H_{n,i} F_{\bar{n}} x_{\bar{n}}$, the precoder construction module 320_3 uses the precoder $F_{\bar{n}}$ to align the corresponding signal $x_{\bar{n}}$ processed through the channel matrix $H_{n,i}$ to the same space, as shown by Equation (7) below:

$$\text{span}\{H_{n,1} F_{\bar{n}}\} = \text{span}\{H_{n,2} F_{\bar{n}}\} \Rightarrow \text{span}\{F_{\bar{n}}\} = \text{span}\{(H_{n,1})^{-1} H_{n,2} F_{\bar{n}}\}, n, \bar{n} \in \{1,2\}, \bar{n} \neq n. \quad \text{Equation (7)}$$

Based on Equation (7), if n=2, the matrix $(H_{n,1})^{-1} H_{n,2}$ forms the first precoder set corresponding to the first cluster 231, and if n=1, the matrix $(H_{n,1})^{-1} H_{n,2}$ forms the second precoding set corresponding to the second cluster 232.

In step S440, the precoder selection module 320_4 selects a first precoder from the first precoding set and selects a second precoder from the second precoding set. Herein, the second precoder aligns the first channel and the second channel between the base station 210 and the user equipments in the first cluster 231 to a first space, and the first precoder aligns the third channel and the fourth channel between the base station 210 and the user equipments in the second cluster 232.

In the present embodiment, the precoder selection module 320_4 performs an eigen-decomposition for the first precoding set and the second precoding set (i.e., $(H_{n,1})^{-1} H_{n,2}$, $n \in \{1,2\}$), so as to generate a plurality of first eigenvectors and a plurality of second eigenvectors of the first precoding set and the second precoding set. The first eigenvectors and the second eigenvectors may be expressed as Equation (8) below:

$$E_n = [e_n^{(1)} e_n^{(2)} \ldots e_n^{(M)}]_{M \times M}, n \in \{1,2\} \quad \text{Equation (8)}$$

wherein if n=2, the matrix $E_n$ forms the first eigenvectors of the first precoding set, and if n=1, the matrix $E_n$ forms the second eigenvectors of the second precoding set.

Next, the precoder selection module 320_4 selects a first part from the first eigenvectors to serve as the first precoder and selects a second part from the second eigenvectors to serve as the second precoder. In the present embodiment, based on Equation (7), the second precoder may align the first channel and the second channel between the base station 210 and the user equipments in the first cluster 231 to a first space, and the first precoder may align the third channel and the fourth channel between the base station 210 and the user equipments in the second cluster 232. The first channel, the second channel, the third channel, and the fourth channel as mentioned before may be represented by $H_{1,1}$, $H_{1,2}$, $H_{2,1}$, and $H_{2,2}$, respectively, which are corresponding to the first signal, the second signal, the third signal, and the fourth signal to be transmitted to the user equipments 221, 222, 223, and 224, respectively. It should be noted that, because the number of transmit symbols N is one half of the number of antennas M equipped in the base station 210 or the user equipments 221, 222, 223, and 224, an amount of the first part is one half of the first eigenvectors and an amount of the second part is one half of the second eigenvectors, but the invention is not limited thereto. Thereafter, the first precoder and the second precoder may be expressed as Equation (9) below:

$$F_{\bar{n}} = [e_n^{(1)} e_n^{(2)} \ldots e_n^{(N)}]_{M \times N}, \bar{n}, n \in \{1, 2\}, \bar{n} \neq n \quad \text{Equation (9)}$$

wherein N=M/2. Therefore, based on Equation (9), if n=2, the matrix $F_{\bar{n}}$ forms the first precoder, and if n=1, the matrix $F_{\bar{n}}$ forms the second precoder.

In step S450, the signal computation module 320_5 multiplies the first cluster signal by the first precoder to generate a first transmission signal and multiplies the second cluster signal by the second precoder to generate a second transmission signal. In step S460, the signal superposition module 320_6 superposes the first transmission signal and the second transmission signal and simultaneously transmits a resulting signal via the transceiver circuit 210 to the user equipments in the first cluster 231 and the user equipments in the second cluster 232.

In the present embodiment, as similar to aforementioned Equation (4), the signal computation module 320_5 multiplies the first cluster signal (vector) and the second cluster signal (vector) by the corresponding the first precoder (matrix) and the second precoder (matrix), respectively. That is to say, the first cluster signal and the second cluster signal are precoded according to the first precoder and the second precoder respectively to generate the first transmission signal (vector) and the second transmission signal (vector). After superposing the first transmission signal and the second transmission signal by the signal superposition module 320_6, the resulting signal z transmitted by the base station 210 may be expressed as Equation (10) below $$\hat{x} = \sum_{n=1}^{2} F_n x_n \quad \text{Equation (10)}$$

wherein $F_n \in C^{M \times N}$. Then, the base station 210 may broadcasts the resulting signal $\hat{x}$ to the user equipments 221, 222, 223, and 224.

Because the base station 210 designs the appropriate first precoder $F_1$ and the second precoder $F_2$ according to the channels of the user equipments 221, 222, 223, and 224 in the first cluster 231 and the second cluster 232 respectively in steps S430 to S440, each of the user equipments 221, 222, 223, and 224 at the receiver may use a ZF matrix to effectively cancel the inter-cluster interference signal $H_{n,i} F_{\bar{n}} x_{\bar{n}}$. It should be noted that, because it is assumed that global channel state information is available in this invention, the ZF matrix may be obtained by the base station 210 and then transmitted to the user equipments 221, 222, 223, and 224 or may be directly calculated by the user equipments 221, 222, 223, and 224, which are not particularly limited by the invention.

In an embodiment of the invention, the ZF matrix is obtained by the base station 210 and then transmitted to the user equipments 221, 222, 223, and 224. As such, the base station 210 may further include an interference cancellation matrix generation module 320_7, which is configured to obtain the ZF matrix. For the strong user (i.e., the user equipments 221 or 223) in the n-th cluster, the interference cancellation matrix generation module 320_7 multiplies the second precoder by the first channel or the second channel (i.e., $H_{n,1} F_{\bar{n}}$ or $H_{n,2} F_{\bar{n}}$, n=1) and multiplies the first precoder by the third channel or the fourth channel ($H_{n,1} F_{\bar{n}}$ or $H_{n,2} F_{\bar{n}}$, n=2) for the inter-cluster interference signal $H_{n,1} F_{\bar{n}} x_{\bar{n}}$, and then performs a matrix decomposition to each of the results. It should be noted that, the matrix decomposition may be implemented by various methods such as a QR decomposition or a singular value decomposition (SVD), which are not particularly limited by the invention. In an embodiment, the QR decomposition performed for the matrix $H_{n,1} F_{\bar{n}}$ may be expressed as Equation (11) below:

$$Q_n = [Q_n^{(1)} \quad Q_n^{(2)}]_{M \times M}, R_n = \begin{bmatrix} R \\ 0 \end{bmatrix}_{M \times N}, n \in \{1, 2\}. \quad \text{Equation (11)}$$

Based on Equation (11), it can be known that the last N columns of a matrix $Q_n$ (i.e., a matrix $Q_n^{(2)}$) are corresponding to a null space of the matrix $H_{n,1} F_{\bar{n}}$, such that the ZF matrix may be further expressed as Equation (12) below:

$$G_n = Q_n^{(2)}, n \in \{1, 2\} \quad \text{Equation (12)}$$

wherein if n=1, a first ZF matrix may be obtained, and if n=2, a second ZF matrix may be obtained.

Accordingly, by multiplying the signals received at the receiver (i.e., the user equipments 221, 222, 223, and 224) by the corresponding ZF matrix $G_n^H$, the inter-cluster interference $H_{n,1} F_{\bar{n}} x_{\bar{n}}$ of the received signal related to the third term in Equation (6) may be effectively canceled, as shown by Equation (13) below:

$$G_n^H y_{n,i} = G_n^H H_{n,i} F_n x_n + \overbrace{G_n^H H_{n,i} F_{\bar{n}} x_{\bar{n}}}^{0} + G_n^H v_{n,i}, \quad \text{Equation (13)}$$

$$n, \bar{n} \in \{1, 2\}, \bar{n} \neq n, \text{ and } i \in \{1, 2\}.$$

It is worth mentioning that, the precoding matrix $F_n$ and the ZF matrix $G_n$ as proposed by the invention have unitary property of $F_n^H F_n = I_N$ and $G_n^H G_n = I_N$ so the transmitting power and the receiving power will not be affected.

In addition, for the intra-cluster interference $H_{n,i} F_n \sqrt{\rho_{n,2}} s_{n,2}$ of the received signal $y_{n,i}$ related to the second term in Equation (6), the SIC technology mentioned in FIG. 1 may be applied to each of the first cluster 231 and the second cluster 232 depicted in FIG. 2. Accordingly, after performing the processes of canceling the inter-cluster interference and canceling the intra-cluster interference, the signals received by the strong user and the weak user in the n-th cluster may be expressed as Equations (14.1) and (14.2), respectively, $$\hat{y}_{n,1} = \sqrt{\rho_{n,1}} G_n^H H_{n,1} F_n s_{n,1} + G_n^H v_{n,1}, \quad \text{Equations (14.1)}$$

$$\hat{y}_{n,2} = \sqrt{\rho_{n,1}} G_n^H H_{n,2} F_n s_{n,1} + \sqrt{\rho_{n,2}} G_n^H H_{n,2} F_n s_{n,2} + G_n^H v_{n,2}. \quad \text{Equations (14.2)}$$

In brief, in the method of joint clustering and precoding according to the embodiments of the invention, the base station first divides the at least four user equipments into two clusters, so that the base station may then provide the appropriate precoders for the signals to each cluster according to the channels between the user equipments and the base station. As such, each of the user equipments may use the ZF matrix to cancel the inter-cluster interference and use the SIC technology to cancel the intra-cluster interference at the receiver, so as to achieve the effect of reducing the interferences between multiple user equipments.

On the other hand, based on Equation (14), the capacities of the strong user and the weak user in the n-th cluster may be expressed as the Equations (15.1) and (15.2), respectively, $$C_{n,2}=\log_2 det(I_N+\rho_{n,1}\tilde{H}_{n,1}\tilde{H}_{n,1}^H \tilde{V}_{n,1}^{-1}), \quad \text{Equations (15.1)}$$

$$C_{n,2}=\log_2 det(I_N+\rho_{n,2}\tilde{H}_{n,2}\tilde{H}_{n,2}^H (\rho_{n,1}\tilde{H}_{n,2}\tilde{H}_{n,2}^H \tilde{V}_{n,2})^{-1}) \text{Equations (15.2)}$$

wherein $\tilde{H}_{n,i}=G_n^H H_{n,i} F_n, \tilde{V}_{n,i}=\sigma_{n,i}^2 I_N, n\in\{1,2\}, i\in\{1,2\}$.

Because the precoders $F_n$ of the present embodiment are forming by N eigenvectors selected from the eigenvectors $E_n$ (i.e., step S440), each of the first precoder $F_1$ and the second precoder $F_2$ may have $C_N^M$ combinations (i.e., M!/(N!)² combinations). The first cluster 231 and the second cluster 232 may collectively include a precoder pair $\{F_1,F_2\}$ with a total of $(C_N^M)^2$ combinations (i.e., (M!/(N!)²)² combinations). More specifically, each of the first cluster 231 and the second cluster 232 may include any different two user equipments (step S410) so that the precoder pair $\{F_1,F_2\}$ with the total of 3× (M!/(N!)²)² combinations may be included in the wireless communication system 200. It should be noted that, based on Equation (15), because the precoder $F_n$ is a tall matrix, singular values of the channel matrix $H_{n,i}$ may change as different precoders $F_n$ being multiplied thereto, such that a total capacity of the system may also be changed accordingly.

Figure 5:
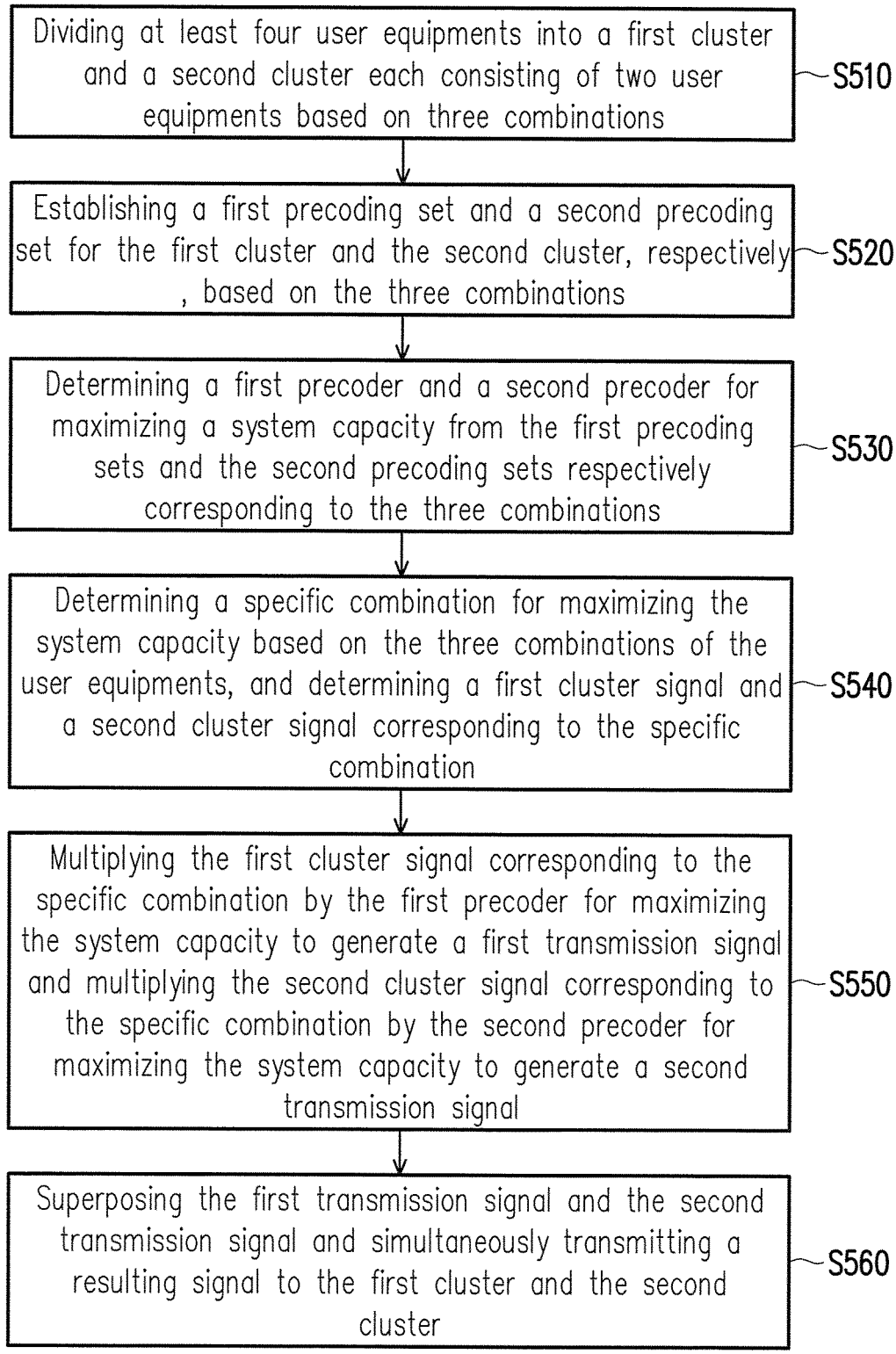
FIG. 5 is a flowchart illustrating the method of joint clustering and precoding for maximizing the system capacity according to an embodiment of the invention.

In order to determine the precoder pair $\{F_1,F_2\}$ for maximizing the system capacity, the present embodiment of the invention further provides a method of joint clustering and precoding for maximizing the system capacity based on the method of FIG. 4. FIG. 5 is a flowchart illustrating the method of joint clustering and precoding for maximizing the system capacity according to an embodiment of the invention. Referring to FIG. 2, FIG. 3, and FIG. 5, the method of FIG. 5 may also be executed by the base station 210 of FIG. 3, and adapted to the wireless communication system 200 depicted in FIG. 2. Each step in the method of joint clustering and precoding for maximizing the system capacity of FIG. 5 is described below with reference to each element of the base station 210 of FIG. 3.

In the present embodiment, the steps in FIG. 5 are similar to those of FIG. 4 and the major difference between the two is that, as compared to step S410, the user configuration module 320_1 divides the user equipments 221, 222, 223, and 224 into the first cluster 231 and the second cluster 232 each consisting of two user equipments based on three combinations in step S510.

For instance, a first combination includes assigning the user equipments 221 and 222 to the first cluster 231 and assigning the user equipments 223 and 224 to the second cluster 232. A second combination includes assigning the user equipments 221 and 223 to the first cluster 231 and assigning the user equipments 222 and 224 to the second cluster 232. A third combination includes assigning the user equipments 221 and 224 to the first cluster 231 and assigning the user equipments 222 and 223 to the second cluster 232. Similarly, as along as each of the first cluster 231 and the second cluster 232 includes any two different user equipments, the present embodiment is not intended to limit the method of dividing the user equipments 221, 222, 223, and 224.

In step S520, based on aforesaid three combinations of the user equipments, the precoder construction module 320_3 establishes the first precoding set and the second precoding set for the first cluster 231 and the second cluster 232, respectively.

Specifically, the precoder construction module 320_3 establishes the precoding sets for the first cluster 231 and the second cluster 232, respectively, based on the eigenspaces of all the MIMO channels in the system. In other words, the precoder construction module 320_3 establishes the first precoding set and the second precoding set corresponding to the first combination, the first precoding set and the second precoding set corresponding to the second combination, and the first precoding set and the second precoding set corresponding to the third combination. The present embodiment is capable of determining a set $F_A$ of the precoder pair $\{F_1,F_2\}$ for the first cluster 231 and the second cluster 232 according to aforementioned Equations (7) to (9). In this way, the set $F_A$ of the precoder pair $\{F_1,F_2\}$ for the first cluster 231 and the second cluster 232 may be expressed as Equation (16) below:

$$F_A=\{F_1=[e_{2,[P]_{s,1}}^{[l]} \ldots e_{2,[P]_{s,N}}^{[l]}], F_2=[e_{1,[P]_{t,1}}^{[l]} \ldots e_{1,[P]_{t,N}}^{[l]}]\} \quad \text{Equation (16)}$$

wherein $l\in\{1,2,3\}$ denotes a l-th combination of the user equipments, P denotes an index matrix containing all M!/(N!)² combinations, $[P]_{s,N}$ and $[P]_{t,N}$ denote column index values of a plurality of first eigenvector matrices $E_1$ and a plurality of second eigenvector matrices $E_2$, respectively, and s=t=1, 2, . . . , M!(N!)².

Accordingly, unlike step S440 in which the precoder selection module 320_4 randomly selects the first precoder from the first precoding set and randomly selects the second precoder from the second precoding set, the precoder selection module 320_4 determines the first precoder and the second precoder for maximizing the system capacity from the first precoding set and the second precoding set individually corresponding to the three combinations in step S530.

In other words, the base station 210 may calculate the system capacity of each of the user equipments 221, 222, 223, and 224 according to each precoder pair $\{F_1, F_2\}$ in Equation (16), and select the precoder pair $\{F_1,F_2\}$ for maximizing the system capacity, as shown by Equation (17) below:

$$W_A^{C max} = \arg\max_{W_A \in F_A} \sum_{n=1}^{2} (C_{n,1} + C_{n,2}) \quad \text{Equation (17)}$$

wherein $W_A$ denotes the precoder pair $\{F_1,F_2\}$ for maximizing the system capacity. It should be noted that, in the present embodiment, the system capacity is a sum of a first capacity of the first cluster 231 and a second capacity of the second cluster 232, but the invention is not limited thereto.

In step S540, based on said three combinations of the user equipments, the signal generation module 320_2 determines a specific combination for maximizing the system capacity and determines the first cluster signal and the second cluster signal corresponding to the specific combination.

In the present embodiment, the base station 210 may determine the user equipments corresponding to the precoder pair $\{F_1,F_2\}$ that maximizes the system capacity, so as to determine the specific combination for maximizing the system capacity corresponding to the first cluster 231 and the second cluster 232 and simultaneously completes the user clustering. Then, the signal generation module 320_2 determines the first cluster signal and the second cluster signal corresponding to the specific combination. Herein, the method of generating the first cluster signal and the second cluster signal is similar or identical to step S420, and detail regarding the same may refer to the description in the foregoing embodiment, which is not repeated hereinafter.

Next, in step S550, the signal computation module 320_5 multiplies the first cluster signal corresponding to the specific combination by the first precoder for maximizing the system capacity to generate the first transmission signal and multiplies the second cluster signal corresponding to the specific combination by the second precoder for maximizing the system capacity to generate the second transmission signal. Lastly, as similar to step S460 in FIG. 4, in step S560, the signal superposition module 320_6 superposes the first transmission signal and the second transmission signal and simultaneously transmits a resulting signal via the transceiver circuit 210 to the first cluster 231 and the second cluster 232.

It should be noted that, in the steps of FIG. 5, the base station 210 generates the precoder pair $\{F_1,F_2\}$ by adopting a method similar to that used in the foregoing embodiment, and the only difference between the two is that the precoder pair $\{F_1,F_2\}$ in the present embodiment is capable of maximizing the system capacity of the wireless communication system 200. Accordingly, in the circumstance where the appropriate first precoder $F_1$ and the second precoder $F_2$ are provided for the first cluster 231 and the second cluster 232 by the base station 210, each of the user equipments 221, 222, 223, and 224 at the receiver may also use the ZF matrix to effectively cancel the inter-cluster interference signal $H_{n,t}F_{\bar{n}}x_{\bar{n}}$.

The method of FIG. 5 may provide the maximized system capacity for the user equipments 221, 222, 223, and 224 but will result in a high complexity issue since said method adopts a use of an exhaustive search for the best precoder pair. Accordingly, in other embodiments of the invention, a method of joint clustering and precoding capable of reducing complexity is further provided.

In the SIC technology of the NOMA system, the base station may perform the power allocation according to the channel gains of the user equipments. Therefore, if a difference between the channel gains of two user equipments in the same cluster is larger, a difference between the powers allocated to the user equipments is also larger. It can be known that, when the difference between the powers allocated to the user equipments is larger, the base station may separate the signals of the user equipments more preferably. Accordingly, the invention further proposes to divide the user equipments 221, 222, 223, and 224 in the wireless communication system 200 into the first cluster 231 and the second cluster 232 each consisting of two user equipments based on the channel gains of the user equipments.

In the present embodiment, with respect to the steps S410 or S510, the user configuration module 320_1 calculates the channel gain $g_i$ of each of the four user equipments 221, 222, 223, and 224, as shown by Equation (18) below:

$$g_i \| H_i \|_F^2, i \in \{221,222,223,224\} \quad \text{Equation (18)}$$

wherein $H_i$ denotes a channel matrix of the i-th user equipment. The user configuration module 320_1 sorts the user equipments 221, 222, 223, and 224 in descending order according to the channel gain $g_i$ of each of the user equipments 221, 222, 223, and 224. Next, the user configuration module 320_1 assigns the user equipments sorted at first and third places as the first cluster 231 and assigns the user equipments sorted at second and fourth places as the second cluster 232.

After clustering the user equipments 221, 222, 223, and 224, the present embodiment may also determine the set $F_B$ of the precoder pair $\{F_1,F_2\}$ for the first cluster 231 and the second cluster 232 according to aforementioned Equations (7) to (9), as shown by Equation (19) below:

$$F_B = \{F_1 = [e_{2,[P]_{s,1}} \cdots e_{2,[P]_{s,N}}], F_2 = [e_{1,[P]_{t,1}} \cdots e_{1,[P]_{t,N}}]\} \quad \text{Equation (19)}$$

wherein P denotes the index matrix containing all the $M!/(N!)^2$ combinations, $[P]_{s,N}$ and $[P]_{t,N}$ denote the column index values of the first eigenvector matrices $E_1$ and the second eigenvector matrices $E_2$, respectively, and $s=t=1, 2, \ldots, M!/(N!)^2$.

Accordingly, based on the method of calculating the system capacity in Equation (15), the base station 210 may calculate the system capacity of each of the user equipments 221, 222, 223, and 224 and select the precoder pair $\{F_1,F_2\}$ for maximizing the system capacity according to each precoder pair $\{F_1,F_2\}$ in Equation (19), as shown by Equation (20) below:

$$W_B^{C_{max}} = \arg\max_{W_B \in F_B} \sum_{n=1}^{2} (C_{n,1} + C_{n,2}) \quad \text{Equation (20)}$$

wherein $W_B$ denotes the precoder pair $\{F_1,F_2\}$ for maximizing the system capacity. It is worth mentioning that, because the present embodiment considers only one combination for clustering the user equipments, the set $F_B$ of the precoder pair $\{F_1,F_2\}$ includes a total of $(C_N^M)^2$ combinations (i.e., $(M!/(N!)^2)^2$ combinations), and thus, as compared to the set $F_A$ of the precoder pair $\{F_1,F_2\}$ having the $3\times(C_N^M)^2$ combination, the complexity in calculation for determining the precoder pair $\{F_1,F_2\}$ for maximizing the system is reduced to one-third the complexity of the foregoing embodiment.

In brief, in the method of joint clustering and precoding according to the present embodiment of the invention, the base station divides the at least four user equipments into two cluster based on the three combinations of the user equipments. Further, the base station establishes the precoding sets corresponding two clusters based on the three combinations of the user equipments, selects the precoder pair for maximizing the system capacity from the precoding sets, and simultaneously completes the user clustering, so as to achieve the effect of maximizing the system capacity of the downlink system. In addition, in order to reduce the complexity in calculation for determining the precoder pair for maximizing the system capacity, the method of considering only one combination for clustering the user equipments may be adopted according to the channel gain of the each user equipment. Accordingly, not only the effect of reducing the interferences between the user equipments may still be achieved, the system capacity of the NOMA downlink system may further be improved.

Figure 6:
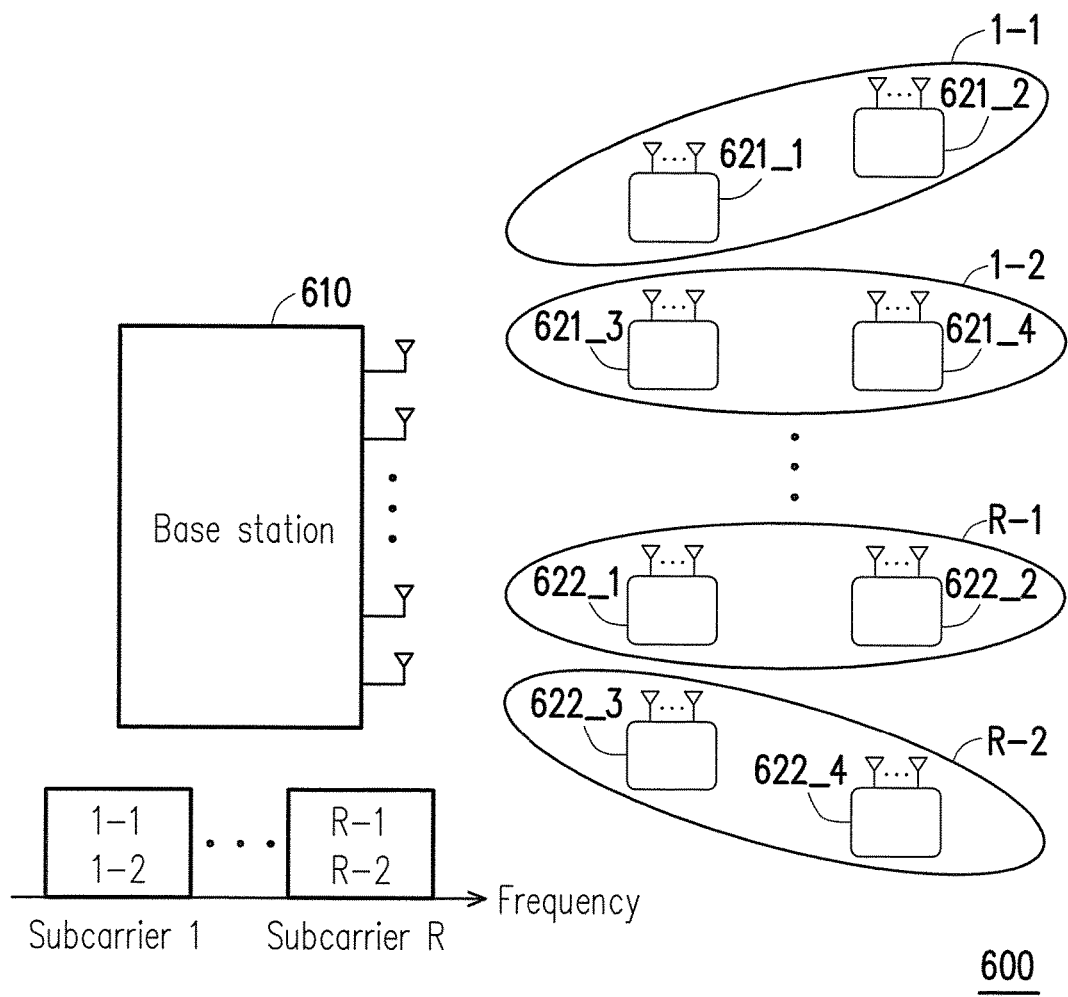
FIG. 6 is a schematic diagram illustrating another wireless communication system according to an embodiment of the invention.

In other embodiments of the invention, the MIMO-NOMA may also be combined with an orthogonal frequency-division multiplexing (OFDM) technology to be applied to the downlink system capable of serving more user equipments. FIG. 6 is a schematic diagram illustrating another wireless communication system according to an embodiment of the invention. Referring FIG. 6, a wireless communication system 600 is a MIMO-NOMA system combined with an OFDM technology, which includes a base station 610 and multiple user equipments (e.g., user equipments 621_1, 621_2, 621_3, 621_4, 622_1, 622_2, 622_3, and 622_4). It should be noted that, although FIG. 6 merely illustrates eight user equipments for example, the invention may be expanded to more user equipments. Each of the base station 610 and the user equipments may be equipped with M antennas, wherein M may be any positive integer greater than 1. In addition, a number of subcarriers of the wireless communication system 600 is R, wherein R may be any positive integer greater than 1. In the present embodiment, each of the subcarriers may be divided into two clusters (e.g., clusters 1-1 and 1-2 or clusters R-1 and R-2) and supports four user equipments. The base station 610 may configure an appropriate precoder pair $\{F_1, F_2\}$ for the clusters of each subcarrier according to the method of joint clustering and precoding provided in the foregoing embodiments.

Figure 7:
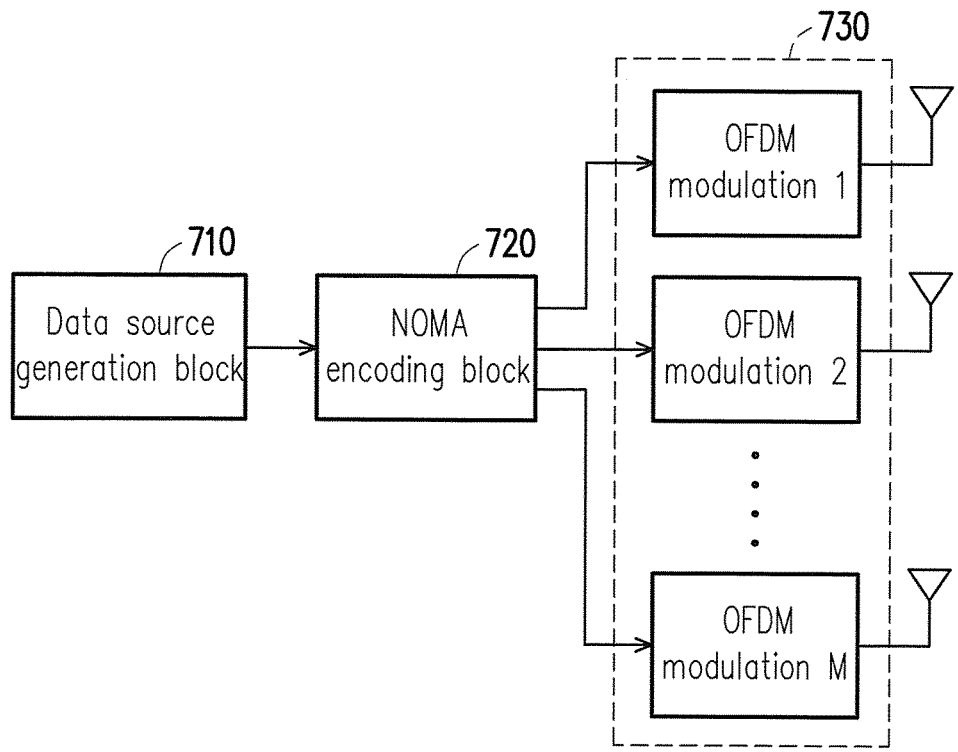
FIG. 7 is a schematic diagram of a transmitter of the wireless communication system depicted in FIG. 6.

FIG. 7 is a schematic diagram of a transmitter of the wireless communication system 600 depicted in FIG. 6. In the present embodiment, a transmitter 700 (i.e., the base station 610) of the wireless communication system 600 at least includes (but not limited to) a data source generation block 710, a NOMA encoding block 720 and an OFDM modulation block 730. The method of joint clustering and precoding provided in the foregoing embodiments may be executed in the NOMA encoding block 720.

Figure 8:
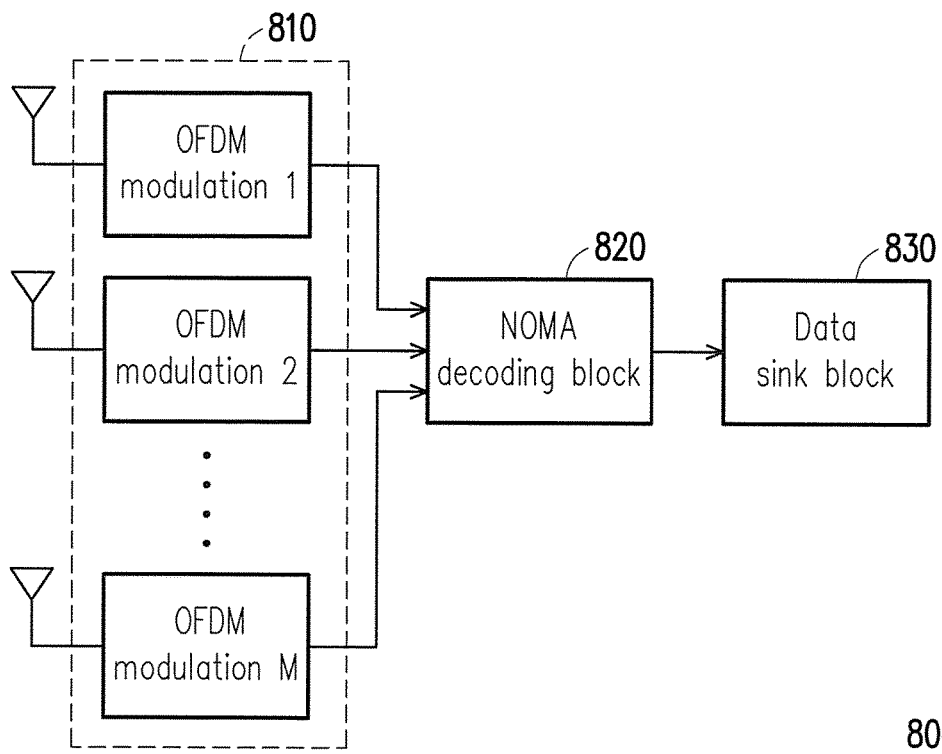
FIG. 8 is a schematic diagram of a receiver of the wireless communication system depicted in FIG. 6.

FIG. 8 is a schematic diagram of a receiver of the wireless communication system 600 depicted in FIG. 6. In the present embodiment, a receiver 800 (i.e., any one of the user equipments 621_1, 621_2, 621_3, 621_4, 622_1, 622_2, 622_3, and 622_4) of the wireless communication system 600 at least includes (but not limited to) an OFDM demodulation block 810, a NOMA decoding block 820 and a data sink block 830. In the present embodiment, the user equipment may cancel the inter-cluster interference by multiplying the received signal by the ZF matrix in the NOMA decoding block 820, cancel the intra-cluster interference by using the SIC technology for the strong user in the same cluster, and directly decode the signal transmitted by the base station for the weak user in the cluster.

In summary, in the method of joint clustering and precoding and the base station using the same according to the embodiments of the invention, the base station first divides the at least four user equipments into two clusters, so that the base station may then provide the appropriate precoders for the signals to each cluster according to the channels between the user equipments and the base station. Alternatively, the base station may divide the at least four user equipments into two clusters based on the three combinations of the user equipments. Then, the base station establishes the precoding sets corresponding two clusters based on the three combinations of the user equipments, selects the precoder pair for maximizing the system capacity from the precoding sets, and simultaneously completes the user clustering. In addition, in order to reduce the complexity in calculation for determining the precoder pair for maximizing the system capacity, the method of considering only one combination for clustering the user equipments may be adopted according to the channel gain of the each user equipment. As such, each of the user equipments may use the ZF matrix to cancel the inter-cluster interference and use the SIC technology to cancel the intra-cluster interference at the receiver. In this way, not only the effect of reducing the interferences between the user equipments may be achieved, the base station may also further increase the system capacity of the NOMA downlink system. On the other hand, the MIMO-NOMA system applying the method of joint clustering and precoding may also be combined with the OFDM technology to be applied to the downlink system capable of serving more user equipments.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of joint clustering and precoding, adapted to a base station for transmitting messages to at least four user equipments in a non-orthogonal multiple access (NOMA) system, and comprising:

dividing the at least four user equipments into a first cluster and a second cluster each consisting of two user equipments;

forming a first cluster signal to be transmitted to the first cluster and a second cluster signal to be transmitted to the second cluster;

establishing a first precoding set and a second precoding set for the first cluster and the second cluster, respectively, by using channel state information between the base station and the at least four user equipments;

selecting a first precoder from the first precoding set and selecting a second precoder from the second precoding set, comprising:

performing an eigen-decomposition for a first channel matrix composed of the third channel and the fourth channel to generate a plurality of first eigenvectors of the first precoding set;

performing the eigen-decomposition for a second channel matrix composed of the first channel and the second channel to generate a plurality of second eigenvectors of the second precoding set; and selecting a first part from the first eigenvectors to serve as the first precoder and selecting a second part from the second eigenvectors to serve as the second precoder, wherein the second precoder aligns a first channel and a second channel between the base station and the user equipments in the first cluster to a first space, and the first precoder aligns a third channel and a fourth channel between the base station and the user equipments in the second cluster to a second space;

multiplying the first cluster signal by the first precoder to generate a first transmission signal and multiplying the second cluster signal by the second precoder to generate a second transmission signal; and superposing the first transmission signal and the second transmission signal and broadcasting a resulting signal to the user equipments in the first cluster and the user equipments in the second cluster.

2. The method according to claim 1, wherein the first cluster signal comprises a first signal and a second signal to be transmitted to a first user equipment and a second user equipment in the first cluster, respectively, and the step of forming the first cluster signal to be transmitted comprises:

comparing a first channel gain of the first user equipment and a second channel gain of the second user equipment;

allocating a first power factor for the first signal and allocating a second power factor for the second signal, wherein the allocated first power factor is less than the second power factor if the first channel gain is greater than the second channel gain;

multiplying the first signal by the first power factor to generate a first user signal and multiplying the second signal by the second power factor to generate a second user signal; and superposing the first user signal and the second user signal for forming the first cluster signal.

3. The method according to claim 2, wherein the second cluster signal comprises a third signal and a fourth signal to be transmitted to a third user equipment and a fourth user equipment in the second cluster, respectively, and the step of forming the second cluster signal to be transmitted comprises:

comparing a third channel gain of the third user equipment and a fourth channel gain of the fourth user equipment;

allocating a third power factor for the third signal and allocating a fourth power factor for the fourth signal, wherein the allocated third power factor is less than the fourth power factor if the third channel gain is greater than the fourth channel gain;

multiplying the third signal by the third power factor to generate a third user signal and multiplying the fourth signal by the fourth power factor to generate a fourth user signal; and superposing the third user signal and the fourth user signal for forming the second cluster signal.

4. The method according to claim 1, wherein an amount of the first part is one half of the first eigenvectors, and an amount of the second part is one half of the second eigenvectors.

5. The method according to claim 1, wherein the first channel, the second channel, the third channel, and the fourth channel are corresponding to the first user equipment, the second user equipment, the third user equipment, and the fourth user equipment, respectively, and after the step of selecting the first precoder from the first precoding set and selecting the second precoder from the second precoding set, the method further comprises:

performing a matrix decomposition for the first precoder multiplied by the third channel or the fourth channel to obtain a first zero forcing matrix;

performing the matrix decomposition for the second precoder multiplied by the first channel or the second channel to obtain a second zero forcing matrix; and informing the first cluster and the second cluster of the first zero forcing matrix and the second zero forcing matrix, respectively.

6. The method according to claim 1, wherein the at least four user equipments comprise a first user equipment, a second user equipment, a third user equipment, and a fourth user equipment, and the step of dividing the at least four user equipments into the first cluster and the second cluster each consisting of two user equipments comprises three combinations, wherein a first combination comprises assigning the first user equipment and the second user equipment to the first cluster and assigning the third user equipment and the fourth user equipment to the second cluster, wherein a second combination comprises assigning the first user equipment and the third user equipment to the first cluster and assigning the second user equipment and the fourth user equipment to the second cluster, wherein a third combination comprises assigning the first user equipment and the fourth user equipment to the first cluster and assigning the second user equipment and the third user equipment to the second cluster.

7. The method according to claim 6, wherein the step of establishing the first precoding set and the second precoding set for the first cluster and the second cluster, respectively, by using the channel state information between the base station and the at least four user equipments comprises:

establishing the first precoding set and the second precoding set corresponding to the first combination;

establishing the first precoding set and the second precoding set corresponding to the second combination; and establishing the first precoding set and the second precoding set corresponding to the third combination.

8. The method according to claim 7, wherein the step of selecting the first precoder from the first precoding set and selecting the second precoder from the second precoding set comprises:

determining the first precoder and the second precoder for maximizing a system capacity from the first precoding set and the second precoding set individually corresponding to the three combinations, wherein the system capacity is a sum of a first capacity of the first cluster and a second capacity of the second cluster.

9. The method according to claim 8, wherein the step of multiplying the first cluster signal by the first precoder to generate the first transmission signal and multiplying the second cluster signal by the second precoder to generate the second transmission signal comprises:

determining a specific combination for maximizing the system capacity from the three combinations;

determining the first cluster signal and the second cluster signal corresponding to the specific combination; and multiplying the first cluster signal corresponding to the specific combination by the first precoder for maximizing the system capacity to generate the first transmission signal and multiplying the second cluster signal corresponding to the specific combination by the second precoder for maximizing the system capacity to generate the second transmission signal.

10. The method according to claim 1, wherein the step of dividing the at least four user equipments into the first cluster and the second cluster each consisting of two user equipments comprises:

calculating a channel gain of each of the at least four user equipments;

sorting the at least four user equipments in descending order according to the channel gain of each of the at least four user equipments; and assigning two user equipments sorted at first and third places as the first cluster and assigning other two user equipments sorted at second and fourth places as the second cluster.

11. A base station, adapted to a NOMA system, and comprising:

a transceiver circuit, configured to transmit messages to at least four user equipments;

a processing circuit, coupled to the transceiver circuit and configured to:

divide the at least four user equipments into a first cluster and a second cluster each consisting of two user equipments;

generate a first cluster signal to be transmitted to the first cluster and generate a second cluster signal to be transmitted to the second cluster;

establish a first precoding set and a second precoding set for the first cluster and the second cluster, respectively, by using channel state information between the base station and the at least four user equipments;

select a first precoder from the first precoding set and select a second precoder from the second precoding set, comprising:

performing an eigen-decomposition for a first channel matrix composed of the third channel and the fourth channel to generate a plurality of first eigenvectors of the first precoding set;

performing the eigen-decomposition for a second channel matrix composed of the first channel and the second channel to generate a plurality of second eigenvectors of the second precoding set; and selecting a first part from the first eigenvectors to serve as the first precoder and selecting a second part from the second eigenvectors to serve as the second precoder, wherein the second precoder aligns a first channel and a second channel between the base station and the user equipments in the first cluster to a first space, and the first precoder aligns a third channel and a fourth channel between the base station and the user equipments in the second cluster to a second space;

multiply the first cluster signal by the first precoder to generate a first transmission signal and multiply the second cluster signal by the second precoder to generate a second transmission signal; and superpose the first transmission signal and the second transmission signal and broadcast a resulting signal via the transceiver circuit to the user equipments in the first cluster and the user equipments in the second cluster.

12. The base station according to claim 11, wherein the first cluster signal comprises a first signal and a second signal to be transmitted to a first user equipment and a second user equipment in the first cluster, respectively, and the processing circuit is further configured to execute steps of:

comparing a first channel gain of the first user equipment and a second channel gain of the second user equipment;

allocating a first power factor for the first signal and allocating a second power factor for the second signal, wherein the allocated first power factor is less than the second power factor if the first channel gain is greater than the second channel gain;

multiplying the first signal by the first power factor to generate a first user signal and multiplying the second signal by the second power factor to generate a second user signal; and superposing the first user signal and the second user signal into the first cluster signal.

13. The base station according to claim 12, wherein the second cluster signal comprises a third signal and a fourth signal to be transmitted to a third user equipment and a fourth user equipment in the second cluster, respectively, and the processing circuit is further configured to execute steps of:

comparing a third channel gain of the third user equipment and a fourth channel gain of the fourth user equipment;

allocating a third power factor for the third signal and allocating a fourth power factor for the fourth signal, wherein the allocated third power factor is less than the fourth power factor if the third channel gain is greater than the fourth channel gain;

multiplying the third signal by the third power factor to generate a third user signal and multiplying the fourth signal by the fourth power factor to generate a fourth user signal; and superposing the third user signal and the fourth user signal into the second cluster signal.

14. The base station according to claim 11, wherein an amount of the first part is one half of the first eigenvectors, and an amount of the second part is one half of the second eigenvectors.

15. The base station according to claim 11, wherein the first channel, the second channel, the third channel, and the fourth channel are corresponding to the first user equipment, the second user equipment, the third user equipment, and the fourth user equipment, respectively, and the processing circuit is further configured to execute steps of:

performing a matrix decomposition for the first precoder multiplied by the third channel or the fourth channel to obtain a first zero forcing matrix;

performing the matrix decomposition for the second precoder multiplied by the first channel or the second channel to obtain a second zero forcing matrix; and informing the first cluster and the second cluster of the first zero forcing matrix and the second zero forcing matrix, respectively.

16. The base station according to claim 11, wherein the at least four user equipments comprise a first user equipment, a second user equipment, a third user equipment, and a fourth user equipment, and the processing circuit is further configured to execute steps of:

dividing the at least four user equipments into the first cluster and the second cluster each consisting of two user equipments based on three combinations, wherein a first combination comprises assigning the first user equipment and the second user equipment to the first cluster and assigning the third user equipment and the fourth user equipment to the second cluster, wherein a second combination comprises assigning the first user equipment and the third user equipment to the first cluster and assigning the second user equipment and the fourth user equipment to the second cluster, wherein a third combination comprises assigning the first user equipment and the fourth user equipment to the first cluster and assigning the second user equipment and the third user equipment to the second cluster.

17. The base station according to claim 16, wherein the processing circuit is further configured to execute steps of:

establishing the first precoding set and the second precoding set corresponding to the first combination;

establishing the first precoding set and the second precoding set corresponding to the second combination; and establishing the first precoding set and the second precoding set corresponding to the third combination.

18. The base station according to claim 17, wherein the processing circuit is further configured to execute steps of:

determining the first precoder and the second precoder for maximizing a system capacity from the first precoding set and the second precoding set individually corresponding to the three combinations, wherein the system capacity is a sum of a first capacity of the first cluster and a second capacity of the second cluster.

19. The base station according to claim 18, wherein the processing circuit is further configured to execute steps of:

determining a specific combination for maximizing the system capacity from the three combinations;

determining the first cluster signal and the second cluster signal corresponding to the specific combination; and multiplying the first cluster signal corresponding to the specific combination by the first precoder for maximizing the system capacity to generate the first transmission signal and multiplying the second cluster signal corresponding to the specific combination by the second precoder for maximizing the system capacity to generate the second transmission signal.

20. The base station according to claim 11, wherein the processing circuit is further configured to execute steps of:

calculating a channel gain of each of the at least four user equipments;

sorting the at least four user equipments in descending order according to the channel gain of each of the at least four user equipments; and assigning two user equipments sorted at first and third places as the first cluster and assigning two user equipments sorted at second and fourth places as the second cluster.

* * * * *